US006515792B1

(12) United States Patent
Hakimi et al.

(10) Patent No.: US 6,515,792 B1
(45) Date of Patent: Feb. 4, 2003

(54) FAST OPTICAL WAVELENGTH SHIFTER

(75) Inventors: Farhad Hakimi, Watertown, MA (US);
Hosain Hakimi, Watertown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/547,552

(22) Filed: Apr. 12, 2000

(51) Int. Cl.[7] ............................. G02F 1/365; G02B 6/26
(52) U.S. Cl. ...................... 359/326; 359/332; 385/15; 385/27
(58) Field of Search ................................. 359/326–332; 385/11, 15, 24, 27, 39, 122

(56) References Cited

U.S. PATENT DOCUMENTS

| | | | | |
|---|---|---|---|---|
| 5,335,106 A | * | 8/1994 | Paquin et al. | 359/326 X |
| 5,900,956 A | * | 5/1999 | Cotter | 359/139 |
| 5,982,963 A | | 11/1999 | Feng et al. | 385/37 |
| 6,023,360 A | | 2/2000 | Toshio et al. | |
| 6,252,222 B1 | * | 6/2001 | Kasapi et al. | 250/214 R |

FOREIGN PATENT DOCUMENTS

JP  08-248452  1/1997

OTHER PUBLICATIONS

"Real–Time Fourier Transformation in Dispersive Optical Fibers" Tomasz Jannson, Optics Letters, vol. 8, No. 4, Apr. 1983, pp. 232–234.

"Fibre Dispersion or Pulse Spectrum Measurement Using a Sampling Oscilloscope", Y.C. Tong et al., Electronics Letters, vol. 33, No. 11, May 22, 1997, pp. 983–985.

"Space–Switching 2.5 Gbit/s Signals Using Wavelength Conversion and Phased Array Routing," A.A.M. Staring et al., Electronics Letters, vol. 32, No. 4, Feb. 15, 1996, pp. 377–379.

"Applications of the Integrated Waveguide Grating Router," B. Glance et al., Journal of Lightwave Technology, vol. 12, No. 6, Jun. 1994, pp. 957–962.

"Waveguide Array Wavelength Router Design to Improve Insertion Loss Uniformity", Hideaki Okayama et al., Optical Review, vol. 4, No. 5, 1997, pp. 543–545.

"Recent Progress in Silica–Based Planar Lightwave Circuits on Silicon," M. Kawachi, IEE Proc. Optoelectron, vol. 143, No. 5, Oct. 1996, pp. 257–261.

"Devices for Wavelength–Division Multiplexing (WDM)," Pierangelo Morra et al., Fiber Optics Handbook for Engineers and Scientists, Frederick C. Allard, Ed., 1990, Ch. 3, pp. 3.63–3.78.

"Interferometric All–Optical Switches for Ultrafast Signal Processing", Naimish S. Patel et al., Applied Optics, vol. 37, No. 14, May 10, 1998, pp. 2831–2842.

"Nonlinear Loop Mirror Devices and Applications," K.J. Blow et al., BT Technol J, vol. 11, No. 2, Apr. 1993, pp. 99–107.

"New 3–Port/4–Port Optical Circulator," Jay Van Delden, Photonics Spectra, Jan. 1992, 2 pages.

"Dense Wavelength Division Multiplexer," 1X16 and 1Z32 DWDM's with Integral Thermal Management System, Lucent Technologies Advertisement (1997), 2 pages.

(List continued on next page.)

*Primary Examiner*—John D. Lee
(74) *Attorney, Agent, or Firm*—Fish & Richardson P.C.

(57) ABSTRACT

A process shifts wavelengths of optical pulses. The process includes transmitting an incoming optical pulse through a nonlinear optical material, splitting the transmitted pulse into a plurality of mutually coherent optical pulses, and recombining the mutually coherent pulses with temporal delays. The recombined pulses produce a temporal interference pattern. The pattern has a peak whose wavelength is shifted with respect to the wavelength of the incoming optical pulse.

20 Claims, 10 Drawing Sheets

OTHER PUBLICATIONS

"Dense Wavelength Division Multiplexing Networks: Principles and Applications," C.A. Bracket, IEEE Journal on Selected Areas in Communications, vol. 8, No. 6, Aug. 1990, pp. 948–964.

"Dispersion and Nonlinear Effects in Optical Fibres: A Pedagogical Account", A. Ghatak et al., Int'l Journal of Optoelectronics, vol. 8, No. 4, 1993, pp. 299–318.

Hakimi et al., "Temporal Gratings and their applications in fiber optics communications and measurements", LEOS '99 IEEE Lasers and Electro–Optics Society 1999 $12^{th}$ Annual Meeting, San Francisco, CA, USA, IEEE, US, Nov. 8, 1999, pp. 206–207.

Hall K. et al., "An Ultrafast Variable Optical Delay Technique", IEEE Photonics Technology Letters, vol. 12, No. 2, Feb. 2000, pp. 208–210.

* cited by examiner

FAST OPTICAL WAVELENGTH SHIFTER

The U.S. government has non-exclusive rights in this invention pursuant to contract number AF19628-95-C-0002 awarded by DARPA and AF.

TECHNICAL FIELD

This invention relates to optical devices and optical networks.

BACKGROUND

To route optical signals, an optical network may employ programmable optical add/drop multiplexers (OADM's) and optical cross connects (OXC's). OADM's add optical signals to and drop optical signals from optical trunk lines. OXC's switch optical signals between different optical trunk lines. OADM's and OXC's may perform signal routing without converting optical signals into intermediate electrical signals.

To increase transmission bandwidths, an optical network may also perform wavelength division multiplexing. In wavelength division multiplexing, each optical trunk line can transmit several optical signals simultaneously by transmitting the signals at different wavelengths. In wavelength division multiplexed networks, optical elements select and route optical signals based on wavelength.

In wavelength division multiplexed networks, OADM's and OXC's may shift signal wavelengths to enable routing of signals from one optical line to another. Shifting a signal's wavelength enables a switch to route the signal from one optical line where the signal has one wavelength, to another optical line where the same wavelength is already being used to carry another signal. By shifting signal wavelengths, OADM's and OXC's are able to more completely utilize available transmission bandwidth in optical trunk lines of a wavelength division multiplexed network.

SUMMARY

In general, in a first aspect, the invention features a process of shifting wavelengths of optical pulses. The process includes transmitting an incoming optical pulse through a nonlinear optical material, splitting the transmitted pulse into a plurality of mutually coherent optical pulses, and recombining the mutually coherent pulses with inter-pulse temporal delays. The recombined pulses produce a temporal interference pattern. The pattern has a peak whose wavelength is shifted with respect to the wavelength of the incoming optical pulse.

Other embodiments of the process include one or more of the following features. One feature is that the transmitting chirps the incoming optical pulse, which may bandwidth enhance the pulse. The chirping may result from self-phase or cross-phase modulation of the pulse. The chirped pulse has about the same temporal width as the incoming optical pulse. Another feature is that the splitting amplitude splits the pulse. Another feature is that the interference pattern be sent to an optical amplitude discriminator.

The chirping may include applying a control optical signal to the nonlinear optical material to set a spectral modulation level for the incoming optical pulse. To apply the control signal, a voltage may be generated across the nonlinear optical material or a light control signal may be sent through the nonlinear optical material.

The amplitude splitting may include separating the transmitted pulse into a plurality of pulses and sending each pulse of the plurality to a separate optical conduit. The different conduits may have different optical path lengths determined in part by a control signal. The control signal may produce a voltage across or an increased light intensity in a section of one or more of the optical conduits.

In a second aspect, the invention features an apparatus. The apparatus includes a nonlinear optical material capable of chirping optical pulses and a temporal grating generator (TGG) capable of producing a series of mutually coherent optical pulses from a received pulse. The TGG is optically coupled to the nonlinear optical material.

Other embodiments include one or more of the following features. One feature is that the TGG is configured to make pulses of the series overlap. Another feature is that the TGG is a variable TGG that produces several temporal inter-pulse spacings. Another feature is that pulses passing through the TGG and the nonlinear optical material are sent to an amplitude discriminator. Another feature is that the nonlinear optical material is a semiconductor or a low dispersion optical fiber.

The TGG may include an optical amplitude splitter with several output terminals, an optical coupler with several input terminals and optical conduits that connect the output terminals to the input terminals. The optical conduits may have different optical path lengths. One or more of the optical conduits may also have a section whose optical path length is responsive to control signals.

The nonlinear optical material may be coupled to receive optical pulses from the TGG, or the TGG may be coupled to receive optical pulses from the nonlinear optical material.

In a third aspect, the invention features an optical switch. The optical switch includes a wavelength division multiplexer (WDM) and a wavelength shifter to shift a wavelength of an optical pulse. The wavelength shifter is coupled to transmit the optical pulse with a shifted wavelength to the WDM. The wavelength shifter includes a nonlinear optical material capable of chirping pulses and a temporal grating generator (TGG) optically coupled to the nonlinear optical material.

Other embodiments of the switch may include one or more of the following features. One feature is that the wavelength shifter includes an amplitude discriminator coupled to receive optical pulses from the TGG or the nonlinear optical material. Another feature is that the nonlinear optical material is a semiconductor or a low dispersion optical fiber such as a dispersion decreasing fiber. Another feature is that the switch includes an optical coupler having a plurality of input terminals and an output terminal coupled to the wavelength shifter. Another feature is that the optical coupler is a wavelength division multiplexer. The WDM's may be coupled for bi-directional transmission. Another feature is that at least one wavelength shifter connects to an output terminal of the WDM.

In a fourth aspect, the invention features a process for routing optical pulses. The process includes shifting a wavelength of an incoming pulse by transmitting the pulse through both a TGG and a nonlinear optical material. The process also includes routing the pulse with a shifted wavelength to one of a plurality of optical output lines based on the shifted wavelength.

Other embodiments may include one or more of the following features. One feature is that the shifting transmits the incoming pulse through the nonlinear optical medium to chirp the pulse and then sends the chirped pulse through a TGG. Another feature is that the shifting sends the incoming pulse through a TGG to produce a series of mutually coherent pulses and then transmits the series through a nonlinear optical medium to chirp the pulses in the series. Another feature is that the process further shifts the wavelength of the routed pulse to another wavelength in response to routing the pulse to an optical output line having an available transmission channel at the other wavelength.

In a fifth aspect, the invention features a process that shifts wavelengths of optical pulses. The process includes splitting an incoming optical pulse into a plurality of mutually coherent optical pulses and recombining the mutually coherent optical pulses into a series of pulses with inter-pulse temporal delays. The process also includes transmitting the series of pulses through a nonlinear optical material to produce a temporal interference pattern having a peak whose wavelength is shifted with respect to the wavelength of the incoming optical pulse.

Other embodiments include one or more of the following features. One feature is that the transmitting chirps each pulse of the series. Another feature is that the transmitting bandwidth enhances each pulse of the series. Another feature is that the transmitting includes performing one of self-phase modulation and cross-phase modulation on the pulses of the series. Another feature is that the splitting amplitude splits the incoming pulse into a plurality of pulses and sends each pulse of the plurality to a separate optical conduit. Different ones of the optical conduits have different optical path lengths.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
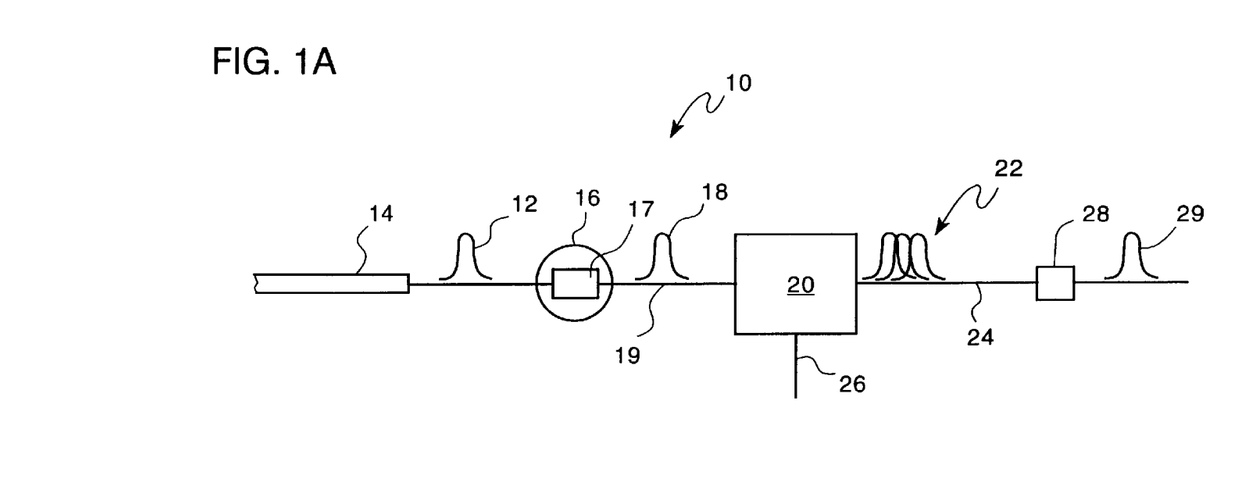
FIG. 1A shows a variable optical wavelength shifter.

A system 10 that shifts wavelengths of optical pulses is shown in FIG. 1A. The system 10 includes a bandwidth enhancer that receives an incoming pulse 12 from an external source 14, e.g., a trunk fiber of an optical network. The bandwidth enhancer 16 includes an optical conduit 17, which is made of a nonlinear optical material such as a semiconductor or a low dispersion optical fiber, e.g., a dispersion decreasing fiber (DDF). The nonlinear optical material has an index of refraction that depends on the square of the light intensity. The bandwidth enhancer 16 connects to a temporal grating generator (TGG) 20 via an optical fiber 19. The TGG 20 connects in turn to an amplitude discriminator 28 via an optical fiber 24. The amplitude discriminator 28 produces an outgoing pulse 29 whose wavelength is shifted with respect to the incoming pulse 12. The size of the wavelength shift may be varied through control signals sent to control input 26 of the TGG 20.

Figure 2:
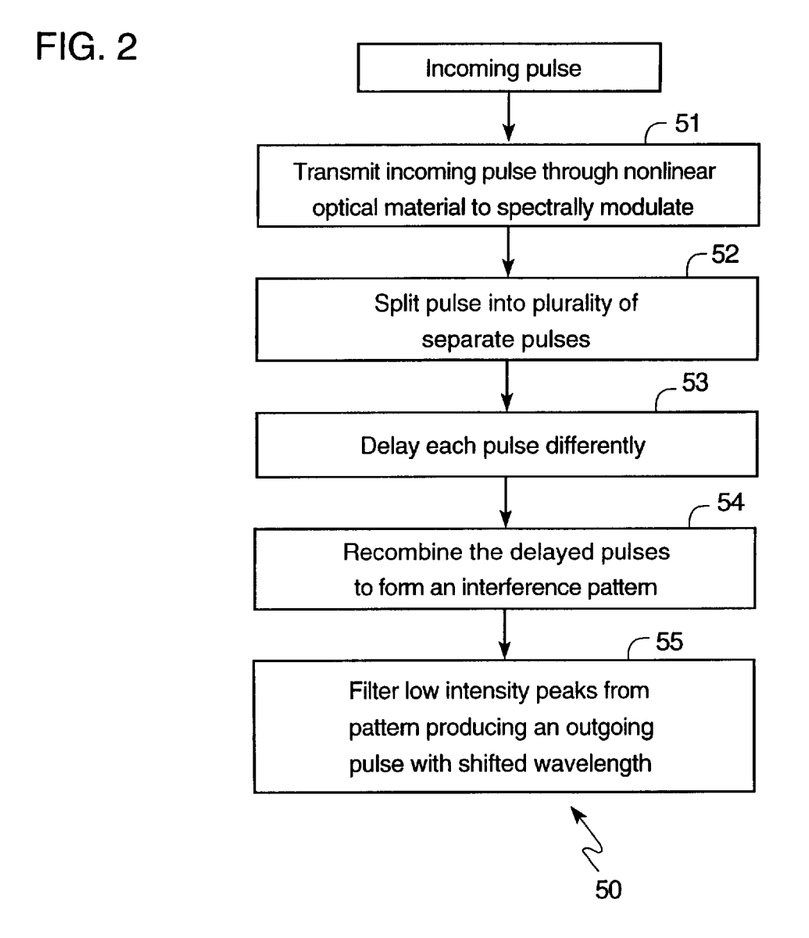
FIG. 2 is a flow chart for a process of shifting a pulse's wavelength with the wavelength shifter of FIG. 1A.

A process 50 for shifting the wavelength of incoming pulse 12 is illustrated by a flow chart shown in FIG. 2. To perform the shift, the process 50 transmits the incoming pulse through a nonlinear optical material to chirp the pulse 12 (step 51). Chirping spectrally modulates the pulse 12 to produce an enhanced pulse 18 whose wavelength varies monotonically along the pulse's temporal envelope. Chirping is also equivalent to a frequency modulation of the pulse 12. Chirping results from self-phase or cross-phase modulation of the pulse 12 in a nonlinear optical material 17 of the bandwidth enhancer 16.

After chirping, the TGG 20 splits the enhanced pulse 18 into a plurality of separate pulses (step 52). The splitting may be performed by amplitude splitting the enhanced pulse 18 or by polarization splitting the enhanced pulse 18, e.g., with birefringent elements. The TGG 20 delays each of the separate pulses by a different time (step 53) and then, recombines the delayed pulses to form a series 22 of overlapping and mutually coherent pulses on optical fiber 24 (step 54). The series 22 of overlapping pulses interferes to produce a pattern with one or more intensity peaks.

Optical fiber 24 carries the interference pattern to amplitude discriminator 28. Amplitude discriminator 28 filters the pattern to remove lower intensity peaks and produce an outgoing pulse 29 from the largest intensity peak (step 55). The outgoing pulse 29 has a wavelength that is shifted with respect to the wavelength of the original incoming pulse 12. In embodiments that make the spacing between pulses of the series 22 a small fraction of a wavelength, the filtering may be unneeded, because the interference pattern has a single peak. For 1.5 $\mu$meter light, the spacing is between about $10^{-6}$ and 1 times the inverse bandwidth.

Figure 1B:
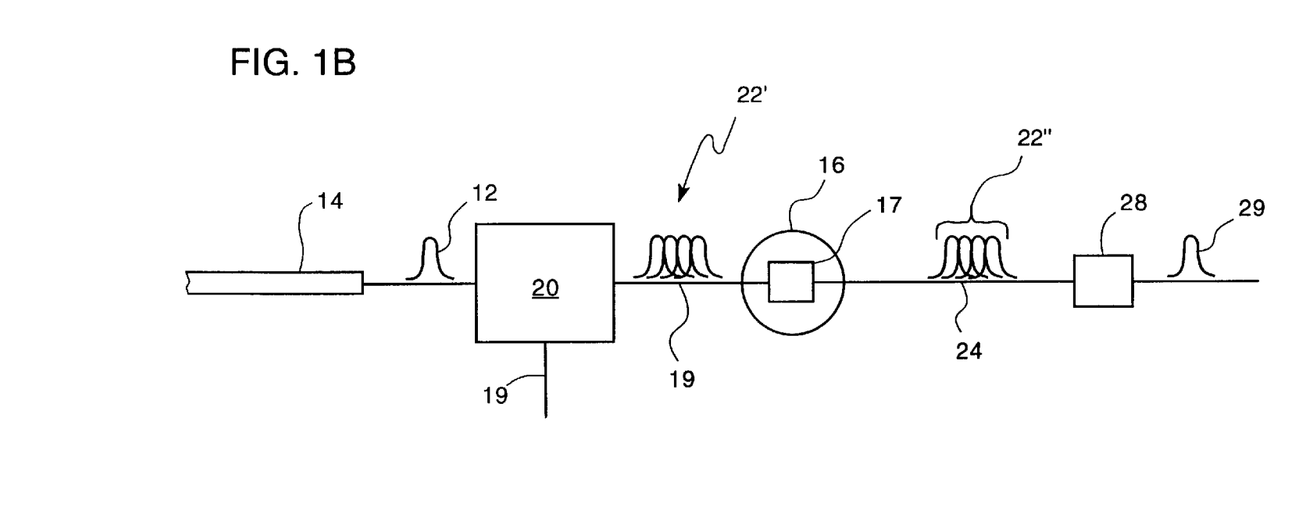
FIG. 1B shows an alternate variable optical wavelength shifter.

An alternate system 10' for shifting the wavelength of an incoming pulse 12 is illustrated in FIG. 1B. In the system 10' the order of bandwidth enhancer 16 and TGG 20 are reversed so that the incoming pulse 12 is first split by the TGG 20 into a plurality of separate pulses. The TGG 20 delays each separate pulse by a different time and then, recombines the delayed pulses to form a series 22' of overlapping and mutually coherent pulses on optical fiber 19. The series 22' of mutually coherent pulses goes to the bandwidth enhancer 16, which uses a nonlinear optical material to chirp each pulse of the series 22'. Chirping produces the series 22 of enhanced and mutually coherent pulses and may be accomplished through self-phase or cross-phase modulation of the pulse 12 in a nonlinear optical material 17. The series 22 of pulses overlaps and interferes to produce a pattern with one or more intensity peaks.

Optical fiber 24 carries the interference pattern to amplitude discriminator 28, which filters the pattern to remove lower intensity peaks thereby producing an outgoing pulse 29 from the largest intensity peak. The outgoing pulse 29 has a wavelength that is shifted with respect to the wavelength of the original incoming pulse 12. In some embodiments, the filtering may be unneeded, because the interference pattern has a single peak.

Figure 3A:
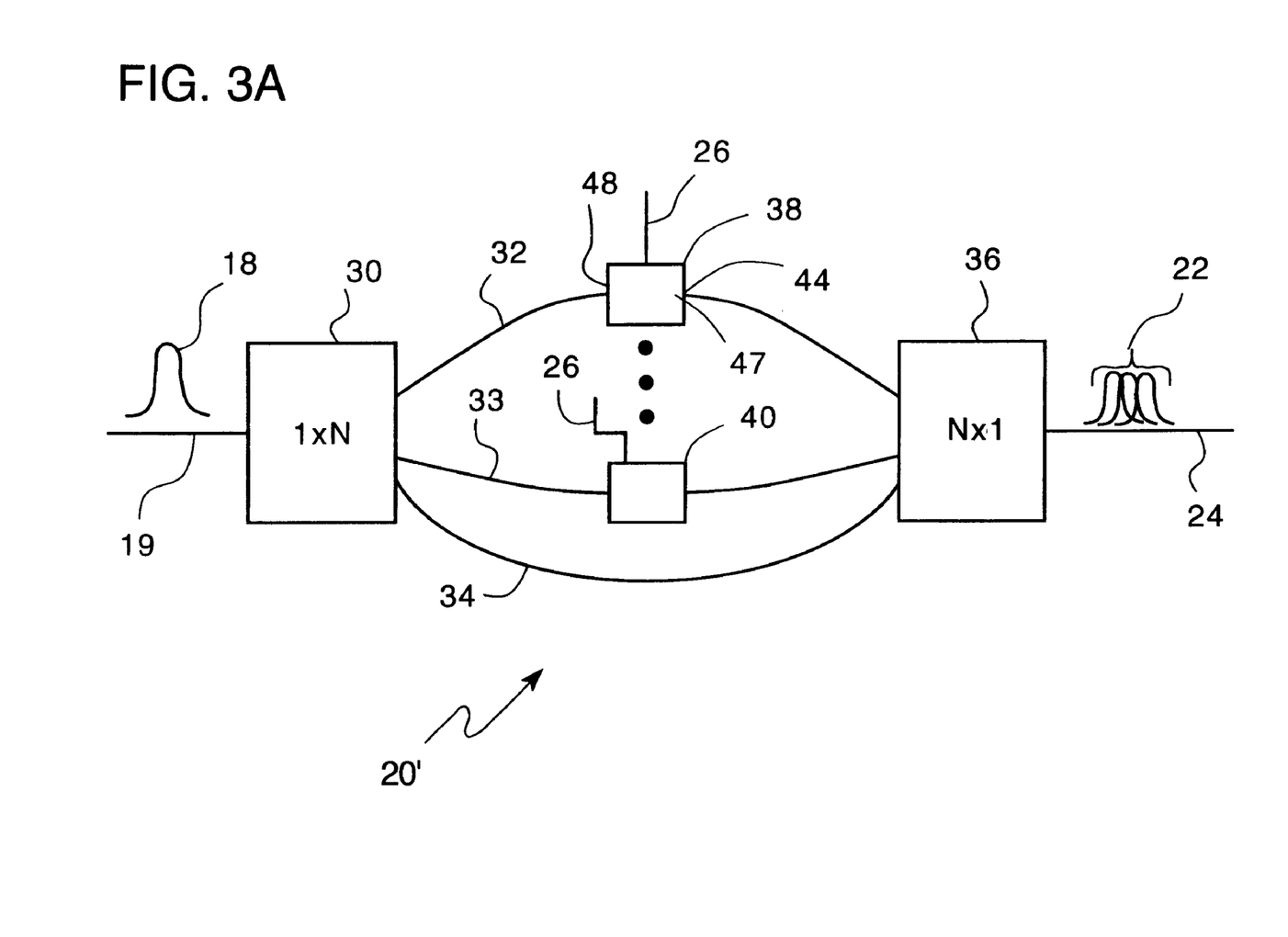
FIGS. 3A and 3B show two embodiments of variable temporal grating generators (TGG's) for use in the wavelength shifters of FIGS. 1A and 1B.

A TGG 20' based on optical amplitude splitting is shown in FIG. 3A. The TGG 20' may be used in systems 10 and 10' of FIGS. 1A and 1B. The TGG 20' has a 1×N optical splitter 30 that receives an enhanced pulse 18 from the bandwidth enhancer 16 via optical fiber 19. The 1×N optical splitter 30 amplitude divides the received pulse 18 into N separate pulses and sends each pulse into one of N separate optical conduits 32–34. The optical conduits 32–34 have different optical lengths and thus, transmit the separate pulses to an N×1 optical coupler 36 with different temporal delays. The N×1 optical coupler 36 optically recombines the pulses received from the conduits 32–34 to produce a series of mutually coherent and overlapping pulses 22 on optical fiber 24. The series 22 of pulses immediately forms a traveling pattern on the optical fiber 24.

Figure 3B:
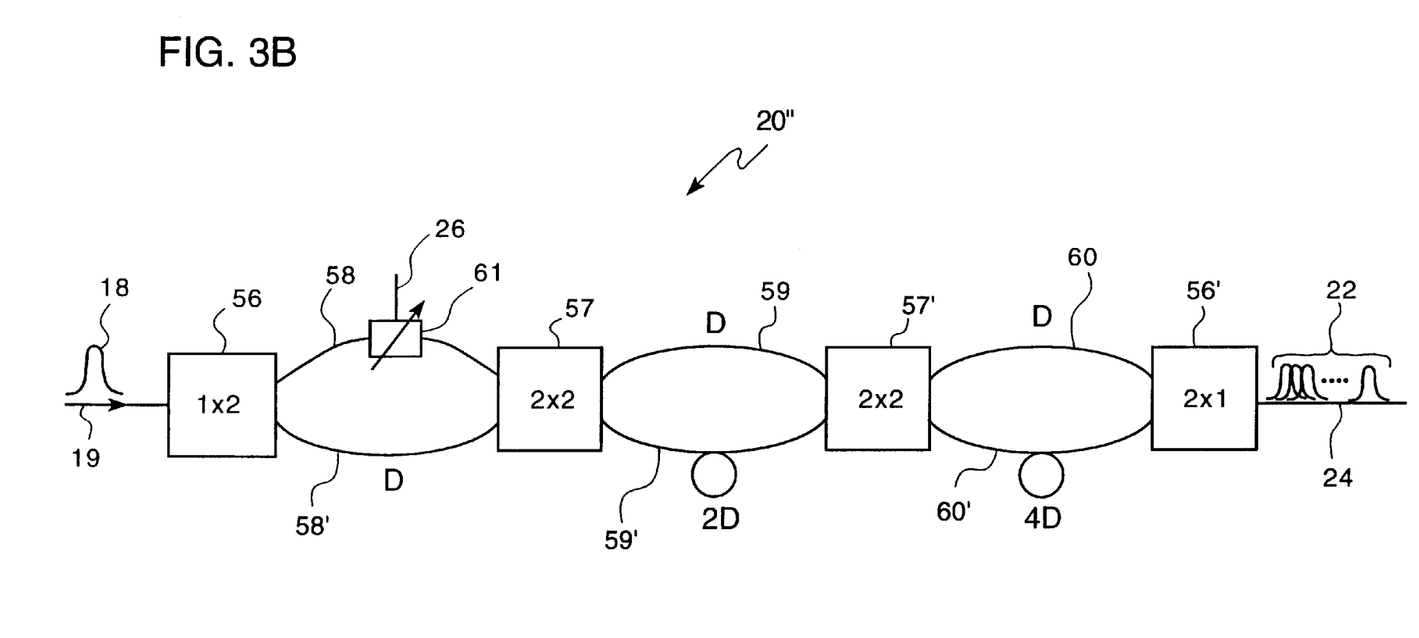

An alternate TGG 20" based on cascaded Mach Zehnder interferometers is shown in FIG. 3B. The TGG 20" may also be used in systems 10 and 10' of FIGS. 1A and 1B. The TGG 20" includes a series of fiber couplers 56, 56', 57, and 57' that are serially connected by pairs of optical fibers (58, 58'), (59, 59'), and (60, 60'). Each coupler 56, 57, 57' amplitude splits received pulses into a pair of pulses and sends one pulse of each pair down one of the fibers connected to the coupler's outputs. The two pulses of the pair acquire a timing difference, because the fibers of each pair (58, 58'), (59, 59'), or (60, 60') have unequal optical lengths, e.g., (D, 2D) or (D, 4D). The timing differences between pulses accumulate as the pulses travel through the stages of interferometers, e.g., producing 8 pulses in the illustrated embodiment. In other embodiments, the TGG 20" may have different numbers of stages and produce series with different numbers of pulses.

In the TGG 20", one fiber 58 has a path section 61 whose optical path length is variable. The section's optical path length may be varied electrically or optically to change the spacing between the mutually coherent pulses produced by the TGG 20".

Other constructions for TGG's have been disclosed in U.S. patent application Ser. No. 09/282,880, filed Mar. 31, 1999; U.S. patent application Ser. No. 09/362,349, filed Jul. 27, 1999 (now U.S. Pat. No. 6,356,677); and U.S. patent application Ser. No. 09/405,262, filed Sep. 23, 1999 (now U.S. Pat. No. 6,427,039). These applications are incorporated by reference in their entirety in the present application. Any disclosed construction for a TGG may be used in the systems 10, 10' of FIGS. 1A and 1B.

Referring again to FIGS. 3A and 3B, the path sections 38, 40, and 61 have optical path lengths that vary in response to control signals received from control input terminal 26. Differences between total optical path lengths of the different optical conduits 32–34 and the different fibers 58–59 determine sizes of inter-pulse spacing between members of the series 22. Changing the inter-pulse spacing changes the positions of intensity peaks in the interference pattern generated by the series 22 of pulses. To change the inter-pulse spacing, the optical path lengths of sections 38, 40, or 61 are changed either electrically or optically.

Figure 4A:
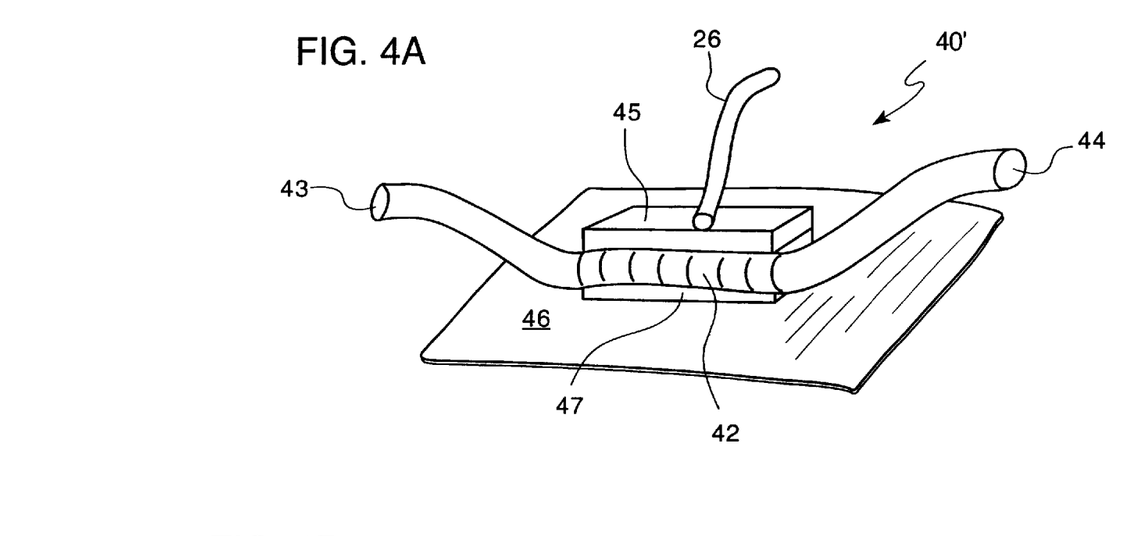
FIG. 4A shows one embodiment of an electro-optically controlled optical path section for use in the TGG of FIGS. 3A or 3B.

An electrically controlled path sections 40' is shown in FIG. 4A. The path section 40' has an optical conduit 42 that transmits optical pulses between input and output terminals 43 and 44. A top surface of the optical conduit 42 is partially covered by a metallic conductive layer 45, which connects electrically to control input terminal 26. The optical conduit 42 rests on a substrate 46 containing a second conductive layer 47. The conductive layers 45, 47 form a capacitive sandwich over about the optical conduit 42.

The optical conduit 42 is constructed of a material whose index of refraction depends on the size of a transverse voltage applied across the conduit 42, e.g., lithium niobate. During operation, a control voltage is applied to metal layer 45 via control input terminal 26 and conductive layer 47 is grounded. The size of the control voltage determines the index or refraction of the optical conduit 42. The index of refraction determines the temporal delay resulting in optical pulses that travel through the conduit 42.

Figure 4B:
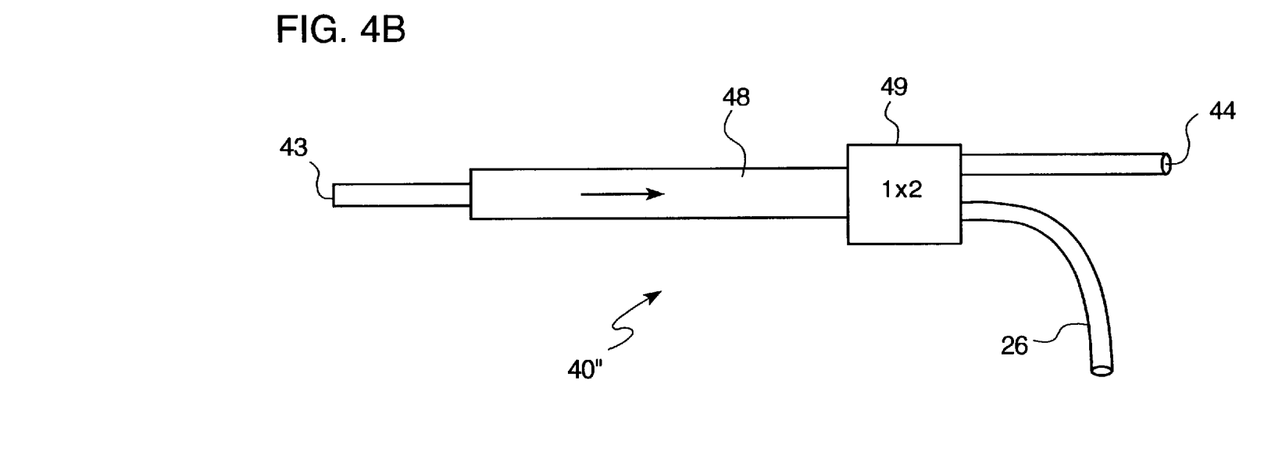
FIG. 4B shows one embodiment of a light controlled optical path section for use in the TGG of FIG. 3A.

An optically controlled path section 40" is shown in FIG. 4B. The path section 40" has an optical conduit 48 that is constructed of an optical nonlinear material. The conduit 48 receives optical pulses from input terminal 43 and transmits the received pulses to output terminal 44 via a 1×2 fiber coupler 49. Another output terminal of the 1×2 fiber coupler 49 connects to the control input terminal 26. In the optically controlled path section 40", the control input terminal 26 receives light control signals. The light control signals set total light intensities in the optical conduit 48 thereby setting the index of refraction of the conduit 48 through the intensity dependence of the index of refraction of the nonlinear optical material. Thus, the light control signals set the optical path length of optical conduit 48. The light control signals travel towards the input terminal 43 in a direction that is opposite to the travel direction of optical pulses in the optical conduit 48. This counter-sense travel reduces wash out of optical pulses at the output terminal 44 by light control signals.

The size of the wavelength shift produced by the system 10 and process 50 of FIGS. 1A and 2 depends on the inter-pulse spacing in the series 22 of overlapping pulses and on the spectral bandwidth of the enhanced pulse 18 produced by chirping. Relationships between the inter-pulse spacing, spectral bandwidth, and produced wavelength shift is illustrated in FIGS. 5A, 5B, 6A, and 6B.

Figure 5A:
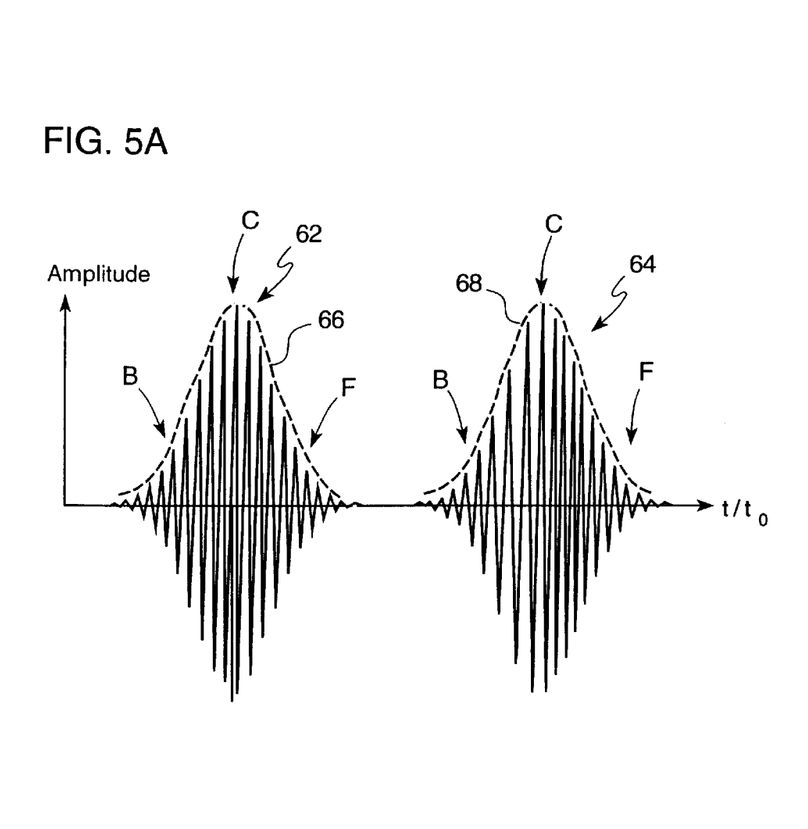
FIG. 5A illustrates spectral modulation produced by a bandwidth enhancer used in the wavelength shifter of FIGS. 1A and 1B.

FIG. 5A illustrates exemplary pulses 62, 64 before and after chirping by propagation through a nonlinear optical material. Before chirping, the pulse 62 has a frequency that is substantially constant at different points F, C, and B on the amplitude envelope 66. The pulse frequency is measured by the temporal interval between amplitude crossing points at the point of interest. After chirping, the pulse 64 has a frequency that increases monotonically between points B and F on amplitude envelope 68. Before and after chirping by the nonlinear optical material, the pulses 62, 64 have approximately the same width.

Figure 5B:
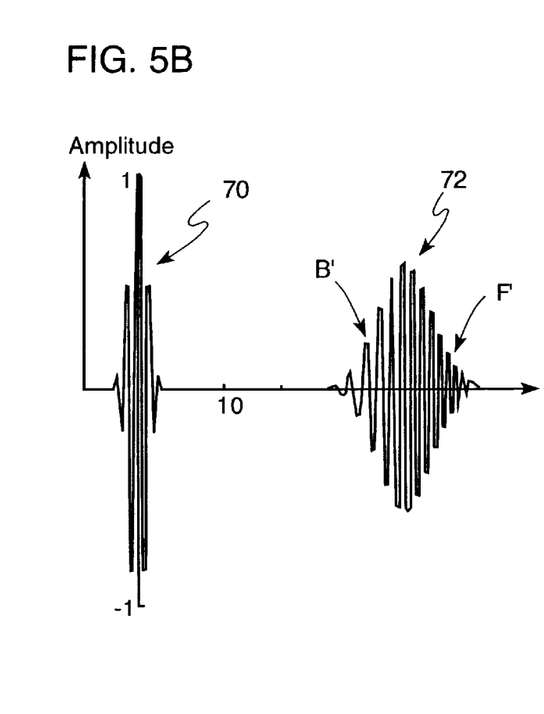
FIG. 5B illustrates pulse modulation produced by propagation in a dispersive medium.

The pulse shaping by a nonlinear optical material can be contrasted with pulse shaping produced by a dispersive medium. FIG. 5B shows exemplary pulses 70 and 72 before and after being shaped by propagation through a dispersive medium. In the original pulse 70 the frequency is substantially constant over the length of the pulse. On the other hand, the pulse 72 has a frequency, which is higher at point F' than at point B'. Thus, propagation through a dispersive medium also induces frequency chirp of an optical pulse. But, propagation through the dispersive medium does not broaden the pulse's spectrum.

The dispersive medium also temporally broadens optical pulses. The temporal broadening causes neighboring series of mutually coherent pulses to spread and can produce overlap. The spreading can produce power loss, and the overlap can produce errors in data transmission. Avoiding overlap can put an upper bound on data speeds in optical transmission systems that use dispersion to chirp pulses. Since nonlinear optical materials can chirp optical pulses without producing temporal broadening, using nonlinear materials to chirp pulses may be advantageous in high-speed transmission systems.

Furthermore, using nonlinear optical materials to enhance pulse spectra through self-phase or cross-phase modulation can generate larger spectral bandwidths, which are otherwise unobtainable through dispersion. Very large bandwidths can be obtained by performing the above modulation processes in a semiconductor such as InGaAsP or low dispersion fibers such as DDF's. The bandwidths obtainable are also larger than natural bandwidths associated with pulses of about tens of pico second durations. Larger spectral bandwidths imply that wavelength shifting systems based on these nonlinear optical materials can function in wavelength division multiplexed networks having larger numbers of spectral channels.

Figure 6A:
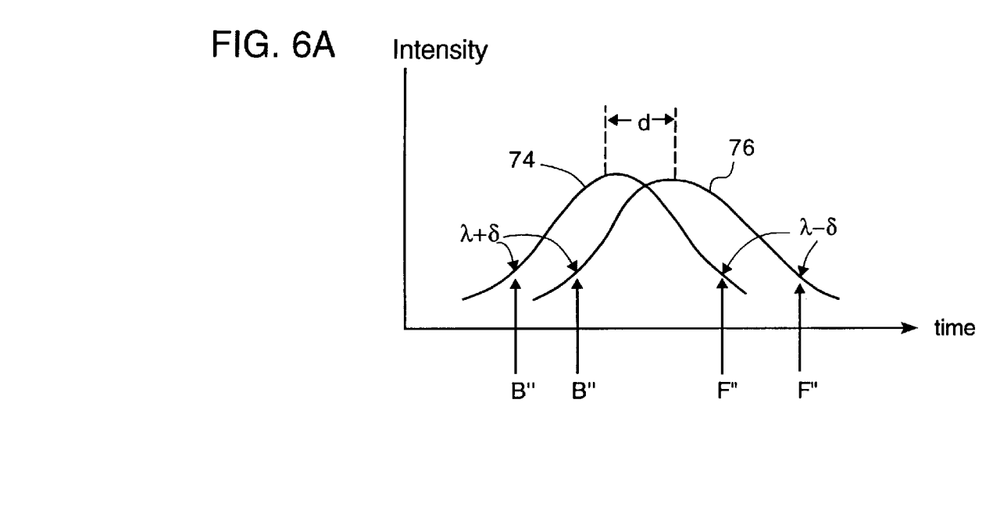
FIGS. 6A and 6B illustrate spectral modulation and pulse interference.
Figure 6B:
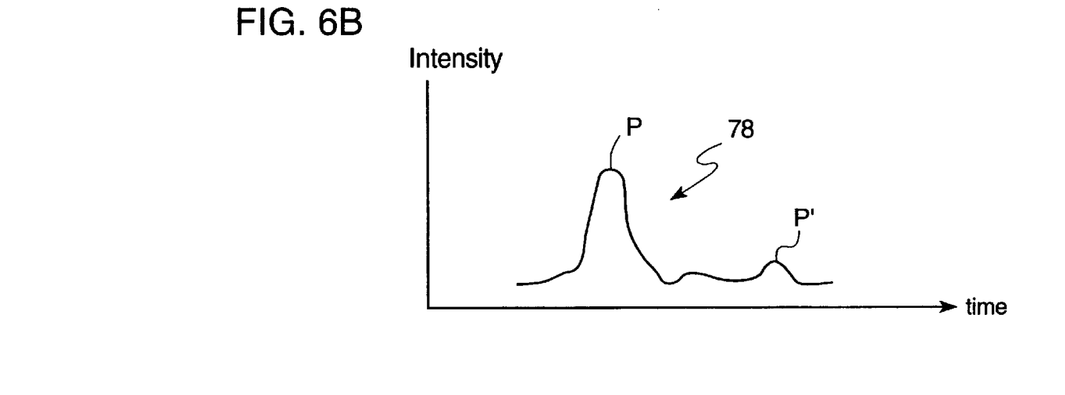

The result of combining two pulses 74 and 76 that are mutually coherent and chirped is illustrated in FIGS. 6A and 6B. The pulses 74 and 76 were produced from a single pulse according to steps 51, 52, and 53 of process 50, shown in FIG. 2. The process 50 has chirped the pulses 74 and 76 so that shorter wavelength $\lambda - \delta$, is found at forward points F" and longer wavelength $\lambda + \delta$ is found at back points B" on the pulse envelopes. The process 50 has also produced peak-to-peak spacing, d, between the pulses 74 and 76 by transmitting two originally in-phase pulses through optical conduits of different lengths, e.g., conduits 32, 33 of FIG. 3A. Transmission through the conduits also gave the pulses 74 and 76 a relative phase difference, which depends on wavelength. Due to the prior position-dependent spectral modulation, the relative phase difference also depends on position along the pulse envelopes.

Upon being recombined, pulses 74 and 76 interfere to produce a pattern with one or more interference peaks P and P' as shown in FIG. 6B. The wavelengths of the peaks P and P' depend on the peak locations within the envelopes of the pulses 74 and 76 because of the spectral modulation of the pulses 76 and 78. The bandwidth of the modulation of each pulse 76 and 78, i.e., equal to $2\delta$ in FIG. 6A, fixes the limit range of wavelengths that the process can provide.

Figure 7:
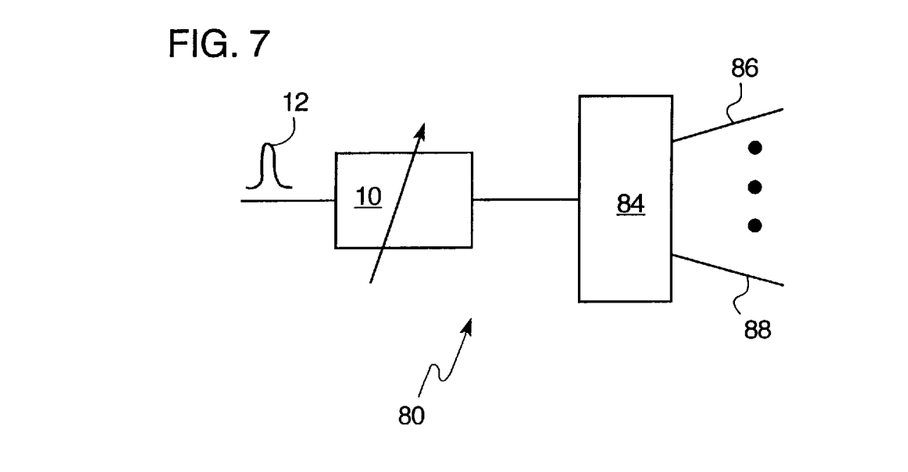
FIG. 7 shows a 1×M optical switch that uses the wavelength shifter of FIG. 1A or of FIG. 1B.

The system 10 for providing variable wavelength shifts enables constructing a 1×N optical switch 80 shown in FIG. 7. In the switch 80, the system 10 of FIG. 1A transmits optical pulses to a wavelength division multiplexer (WDM) 84 having N output terminals 86, 88. Other embodiments may use the system 10' of FIG. 1B in place of the system 10 of FIG. 1A. The WDM 84 selectively routes optical signals to output terminals 86, 88 based on wavelength and may, for example, use a diffraction grating to perform this wavelength selective routing. The system 10 produces a wavelength shift for an incoming optical pulse 12 so that the wavelength-sensitive WDM 84 routes the pulse to a desired output terminal. The system 10 is able to produce wavelength shifts that cause the WDM 82 to route the pulse to any of the N output terminals 86, 88.

Figure 8:
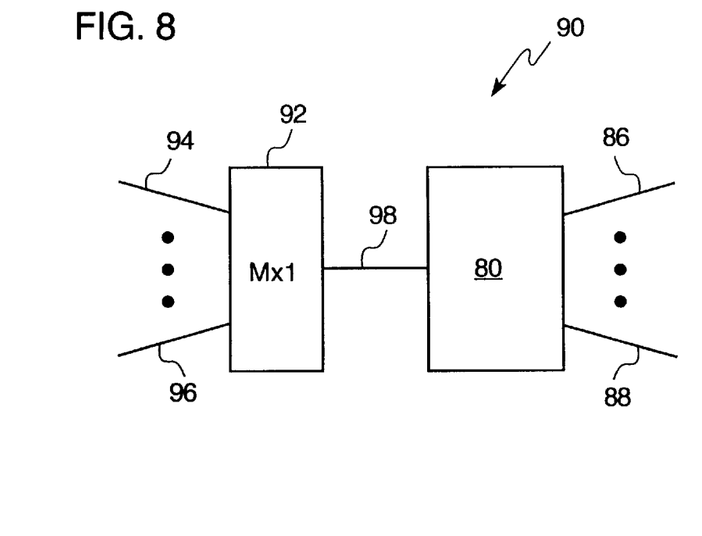
FIG. 8 shows a M×N optical switch based on the 1×M optical switch of FIG. 7.

The 1×N optical switch 80 of FIG. 7 enables constructing an M×N optical switch 90 shown in FIG. 8. In the M×N switch 90, an M×1 optical coupler 92, e.g., an M×1 optical fiber connector or a reversed 1×M WDM, connects M input optical lines 94, 96 to input terminal 98 of the 1×N optical switch 80. The M×1 coupler 92 enables an optical pulse from any of the M optical conduits 94, 96 to be routed to any of the N output terminals 86, 88 of the WDM 84.

In an optical network, the M×N optical switch 90 can perform as either an OXC or an OADM.

Figure 9:
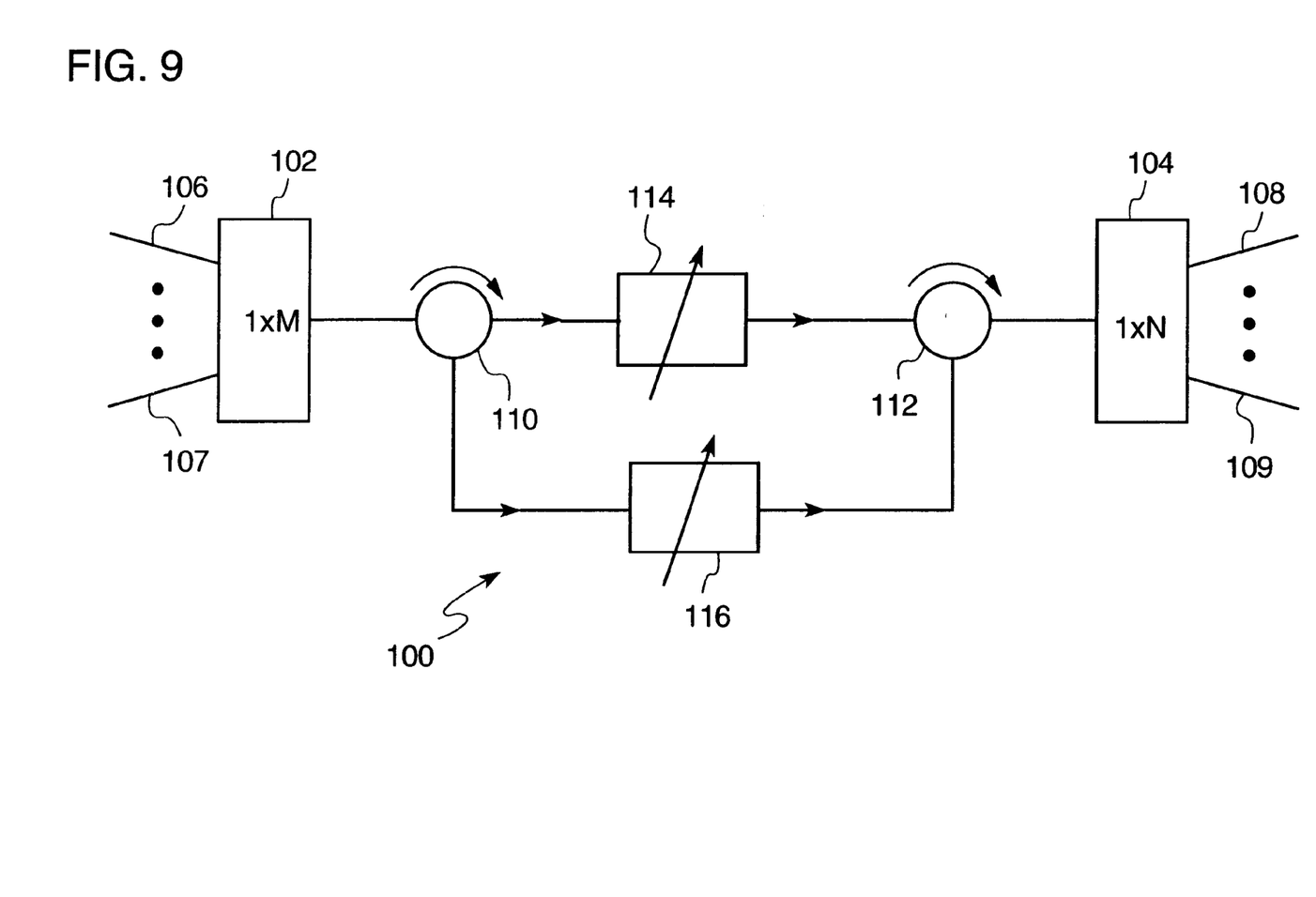
FIG. 9 shows a bi-directional M×N optical switch that uses wavelength shifters of the type shown in FIGS. 1A–1B.

A M×N bi-directional optical switch 100 is shown in FIG. 9. The bi-directional switch includes a 1×M WDM 102 and a 1×N WDM 104. The WDM's 102 and 104 receive incoming optical pulses from any of their output terminals 106, 107 and 108, 109, respectively. In response to receiving an incoming pulse, the WDM 102 or 104 sends the pulse to an optical circulator 110 or 112. The optical circulators 110 and 112 send pulses received from the WDM's 102 and 104 to variable wavelength shifters 114 and 116, respectively. The wavelength shifters 114 and 116 may have the form of the system 10, shown in FIG. 1A, or of the system 10' of FIG. 1B. The variable wavelength shifters 114 and 116 appropriately shift the wavelengths of received pulses and transmit the pulses to the remaining optical circulator 112 and 110, respectively. The optical circulators 112 and 110 transmit pulse received from the wavelength shifters 114 and 116 to the WDM's 104 and 102, respectively. In response to receiving optical pulses from the optical circulators 110 and 112, the WDM's 102 and 104 selectively transmit the pulses to their output terminals 106, 107 and 108, 109 based on the pulse's wavelength.

Figure 10:
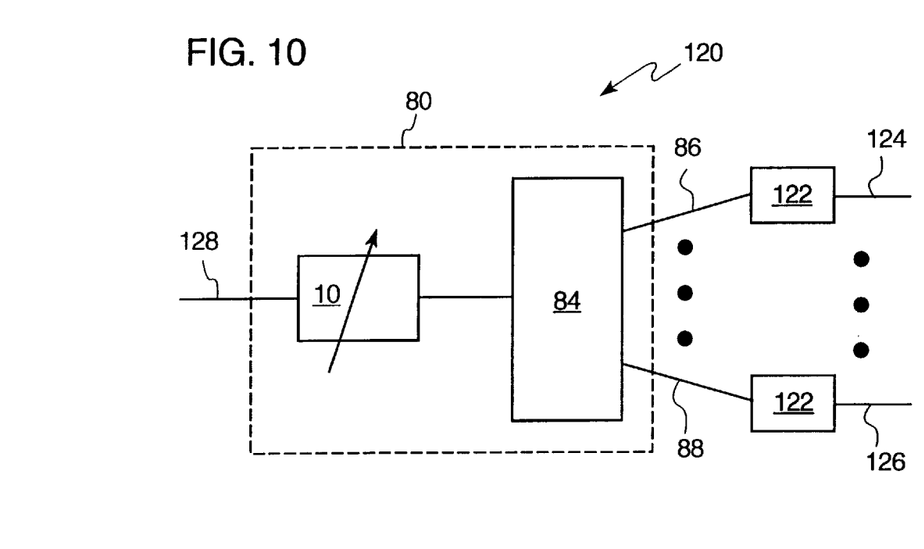
FIG. 10 shows a 1×M optical switch based on the switch of FIG. 7.
Figure 11:
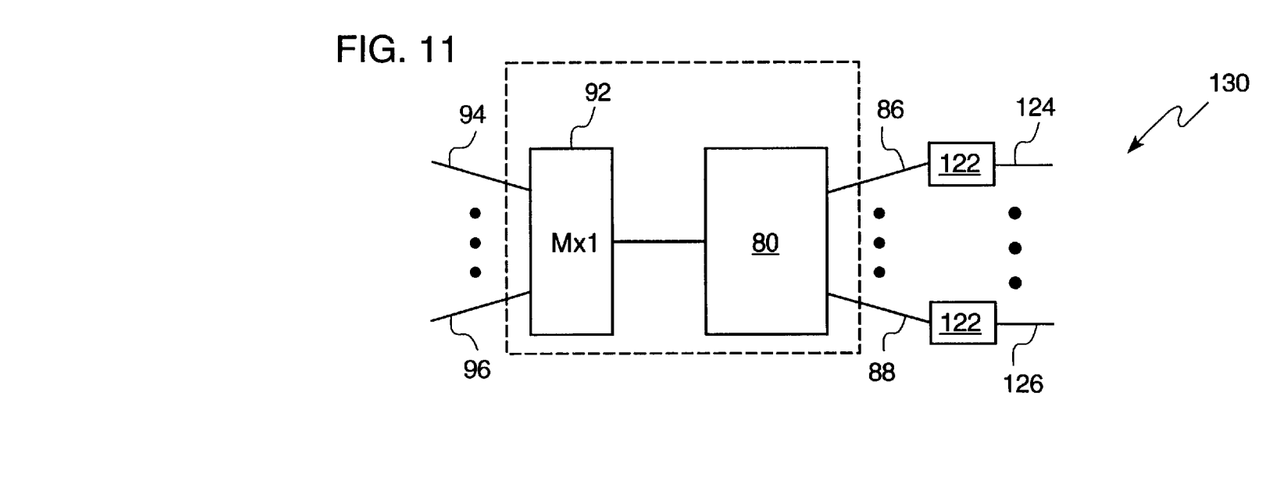
FIG. 11 shows an M×N optical switch based on the switch of FIG. 8.

The optical switches 80, 90, 100 of FIGS. 7, 8, and 9 may be configured for time division multiplexed (TDM) networks in which each trunk line carries optical pulses having a predetermined wavelength. FIG. 10 shows a 1×N optical switch 120 that is based on the 1×N switch 80 of FIG. 7. In the switch 120, wavelength shifters 122, e.g., system 10 of FIG. 1A or system 10' of FIG. 1B, connect output terminals 86 and 88 of WDM 84. The wavelength shifters 122 shift wavelengths of outgoing pulses to the predetermined wavelengths carried by network lines 124 and 126. For TDM networks, the wavelength shifters 122 may be constructed to make fixed wavelength shifts, because optical pulses on each of the network lines 124, 126, and 128 have predetermined wavelengths in TDM networks. FIG. 11 shows an M×N optical switch 130 that is based on the M×N switch 90 of FIG. 8. The switch 130 also has wavelength shifters 122 connected to the output terminals 86 and 88 of the WDM 80. The wavelength shifters 122 shift wavelengths of incoming signals to predetermined values for the lines 124 and 126. The switch 130 can function as an OXC or an OADM in a TDM network.

The optical switches 120 and 130 of FIGS. 10 and 11 can also operate in a wavelength division multiplexed network. In such a network, the wavelength shifters 122 are variable and operate to shift wavelengths of outgoing pulses to wavelength values that correspond to unused channels of WDM lines 124 and 126. Thus, the wavelength shifters 122 enable the switches 120 and 130 to better use available bandwidth in WDM networks. The switch 130 can also function as an OXC or an OADM in a WDM network.

In a WDM network the switch 130 of FIG. 11 may also have variable wavelength shifters (not shown) connected input terminals 94, 96 of the M×1 coupler 92. These wavelength shifters, e.g., systems 10 or 10' of FIGS. 1A and 1B, shift wavelengths of optical pulses, which are incoming from the WDM network, to a preselected wavelength. Then, the 1×N switch 80 receives incoming optical pulses having the preselected wavelength even though the pulses had different wavelengths on source WDM lines.

Wavelength shifters, i.e., shifters 10 and 10' of FIGS. 1A and 1B, may also be placed on the output terminals of the M×N switch 100 shown in FIG. 9. These external shifters may enable the switch 100 to take advantage of available bandwidth in lines that are targets of optical pulse routing.

A number of embodiments of the invention have been described. Nevertheless, it will be understood that various modifications may be made without departing from the spirit and scope of the invention. Accordingly, other embodiments are within the scope of the following claims.

What is claimed is:

1. A process of shifting wavelengths of optical pulses, comprising:

transmitting an incoming optical pulse through a nonlinear optical material;

splitting the transmitted optical pulse into a plurality of mutually coherent optical pulses; and recombining the mutually coherent optical pulses with inter-pulse temporal delays to produce a temporal interference pattern, the pattern having a peak whose wavelength is shifted with respect to the wavelength of the incoming optical pulse.

2. The process of claim 1, wherein the transmitting chirps the incoming optical pulse.

3. The-process of claim 1, wherein the transmitting enhances a bandwidth of the incoming optical pulse.

4. The process of claim 1, wherein the transmitted optical pulse has about the same temporal width as the incoming optical pulse.

5. The process of claim 1, wherein the transmitting includes performing one of self-phase modulation and cross-phase modulation on the incoming optical pulse.

6. The process of claim 1, wherein the transmitting comprises applying a control optical signal to the nonlinear optical material to set a spectral modulation level for the incoming pulse.

7. The process of claim 6, wherein the applying includes one of generating a voltage across the material and sending a light control signal through the material.

8. The process of claim 1, wherein the splitting includes performing one of amplitude splitting and polarization splitting.

9. The process of claim 1, wherein the splitting further comprises:

amplitude splitting the transmitted pulse into a plurality of pulses; and sending each pulse of the plurality to a separate optical conduit, different ones of the optical conduits having different optical path lengths.

10. The process of claim 9, further comprising:

generating a control signal to select the optical path length of at least one of the optical conduits.

11. The process of claim 10, wherein the control signal produces one of a voltage across a section of the at least one of the optical conduits and an increased light intensity in a section of the at least one of the optical conduits.

12. The process of claim 1, further comprising:

sending the interference pattern to an optical amplitude discriminator.

13. A process of shifting wavelengths of optical pulses, comprising:

splitting an incoming optical pulse into a plurality of mutually coherent optical pulses;

recombining the mutually coherent optical pulses into a series of pulses with inter-pulse temporal delays; and transmitting the series of pulses through a nonlinear optical material to produce an optical output signal being a temporal interference pattern having a peak whose wavelength is shifted with respect to a wavelength of the incoming optical pulse.

14. The process of claim 13, wherein the transmitting chirps each pulse of the series.

15. The process of claim 14, wherein the transmitting includes performing one of self-phase modulation and cross-phase modulation on the pulses of the series.

16. The process of claim 13, wherein the transmitting bandwidth enhances each pulse of the series.

17. The process of claim 13, wherein the transmitting comprises applying a voltage to the nonlinear optical material to set a spectral modulation level for pulses.

18. The process of claim 13, wherein the splitting includes performing one of amplitude splitting and polarization splitting.

19. The process of claim 13, wherein the splitting further comprises:

amplitude splitting the incoming pulse into a plurality of pulses; and sending each pulse of the plurality to a separate optical conduit, different ones of the optical conduits having different optical path lengths.

20. The process of claim 13 wherein the nonlinear optical material has an index of refraction that depends on light intensity.

* * * * *

UNITED STATES PATENT AND TRADEMARK OFFICE
CERTIFICATE OF CORRECTION

| | | |
|---|---|---|
| PATENT NO. | : 6,515,792 B1 | Page 1 of 1 |
| APPLICATION NO. | : 09/547552 | |
| DATED | : February 4, 2003 | |
| INVENTOR(S) | : Farhad Hakimi | |

It is certified that error appears in the above-identified patent and that said Letters Patent is hereby corrected as shown below:

Please delete the paragraph encompassing, Column 1, lines 3-5:

"The U.S. government has non-exclusive rights in this invention pursuant to contract number AF19628-95-C-0002 awarded by DARPA and AF."

and replace with:

--This invention was made with government support under Contract No. F19628-95-C-0002 awarded by the U.S. Air Force. The government has certain rights in this invention.--

Signed and Sealed this
Ninth Day of October, 2012

David J. Kappos
*Director of the United States Patent and Trademark Office*